Nov. 7, 1967 C. R. COOK, JR., ETAL 3,351,775

SINGLE PULSE TRIGGER CIRCUIT

Filed May 22, 1964 2 Sheets-Sheet 1

INVENTOR.
Charles R. Cook, Jr.
Billy M. Martin

Nov. 7, 1967 C. R. COOK, JR., ETAL 3,351,775

SINGLE PULSE TRIGGER CIRCUIT

Filed May 22, 1964

2 Sheets-Sheet 2

INVENTOR.
Charles R. Cook, Jr.
Billy M. Martin 3,351,775

SINGLE PULSE TRIGGER CIRCUIT

Charles R. Cook, Jr., Lake Park, Fla., and Billy M. Martin, Dallas, Tex., assignors to Texas Instruments Incorporated, Dallas, Tex., a corporation of Delaware Filed May 22, 1964, Ser. No. 369,432
12 Claims. (Cl. 307—88.5)

ABSTRACT OF THE DISCLOSURE

Disclosed is a circuit which converts a relatively broad wave form of an input signal to a single trigger pulse of relatively short duration. A transistor is connected in the trigger circuit in a common collector configuration such that its switching time is shorter than a second transistor connected in a common emitter configuration. The first transistor initiates the output pulse in response to a change in input voltage which causes the second transistor to switch to a low impedance state, in turn causing the output voltage to fall back to its original value. The output of the circuit is taken from a third transistor used as an emitter follower.

The present invention relates generally to electronic circuits, and more particularly, but not by way of limitation, relates to a single pulse or "one-shot" trigger circuit for producing a single output pulse of relatively short duration in response to a predetermined change in an input voltage signal.

There are many instances when it is desirable to generate a pulse of short duration in response to a predetermined change in an input signal, such as a voltage rise, for driving or triggering another circuit. In particular, computer circuits commonly require a single trigger pulse of relatively short duration in response to a particular occurrence or change in a timing signal, such as, for example, the positive-going portion of a periodically-recurring clock pulse. In logic circuits and computers it is also necessary to provide a suitable means for enabling or disabling the trigger circuit in response to predetermined logic states so as to preform various logic or steering functions. Further, the ideal trigger circuit preferably should have a high input impedance and a low output impedance so as to be capable of driving circuits having relatively high current requirements.

The circuit most used to produce a single trigger pulse in response to a rise in an input voltage signal is essentially a resistor-capacitor circuit. In many applications this is adequate. However, such a circuit has a relatively high output impedance and the use of a capacitor results in an inherent time delay. The resistor-capacitor type trigger circuit is particularly unsuited for use in integrated circuits of the type which are fabricated by forming a large number of active components by diffusing impurities into a single semiconductor crystal because capacitors of the necessary size are particularly difficult to fabricate by this technique. Further, as the drive current required from the trigger circuit is increased, the size capacitor required is correspondingly increased, and the overall operation of the circuit correspondingly slowed down.

Therefore, the present invention contemplates a novel "one-shot" trigger circuit which does not employ any capacitors, which has a low output impedance, which is very fast in operation, which is not overly sensitive to input voltage signal amplitude or input voltage switching times, which can be easily enabled and disabled by conventional logic circuitry, and which can be fabricated as an integrated circuit on a single semiconductor crystal using conventional diffusion techniques.

Without intending to limit the invention at this point, the novel trigger circuit may be described generally as comprising a first transistor connected in a common-collector configuration so as to have a fast response time for initiating the output pulse in response to a change in input voltage, and a second transistor connected in a common emitter configuration so as to have a relatively slow response time for terminating the output pulse in response to the same change in input voltage so that the duration of the output pulse will be determined by the difference in the switching times between the first and second transistors.

More specifically, the first and second transistors are connected substantially in parallel to a resistor which connects each transistor to a voltage source. The base of the first transistor is connected directly to the input circuit and the base of the second transistor is connected through a second resistor to the input circuit. The junction between the emitter of the first transistor and the collector of the second transistor then serves as an output control junction which may be connected to the base of a third transistor in order to reduce the output impedance of the circuit. The output control junction may also be connected to the logic circuits. When the output control junction is connected through low impedance to ground by the logic circuit, the trigger circuit is disabled, and when connected by a high impedance it is enabled.

Therefore an important object of the present invention is to provide a circuit for producing a single pulse of relatively short duration in response to a predetermined change in an input signal.

Another object is to provide such a circuit which is particularly adapted for fabrication as an integrated circuit.

A further object is to provide a circuit of the type described which uses no capacitors and which is therefore very fast-acting.

Yet another object of the invention is to provide a circuit of the type described having a low output impedance so as to drive a binary circuit or the like requiring relatively high currents.

Another object of the invention is to provide a circuit of the type described which is not overly sensitive to the input voltage amplitude.

Still another object of the invention is to provide a circuit of the type described in which the switching time of the input signal is not overly critical.

Many additional objects and advantages of this invention will be evident to those skilled in the art from the following detailed description and drawings, wherein.

Figure 1:
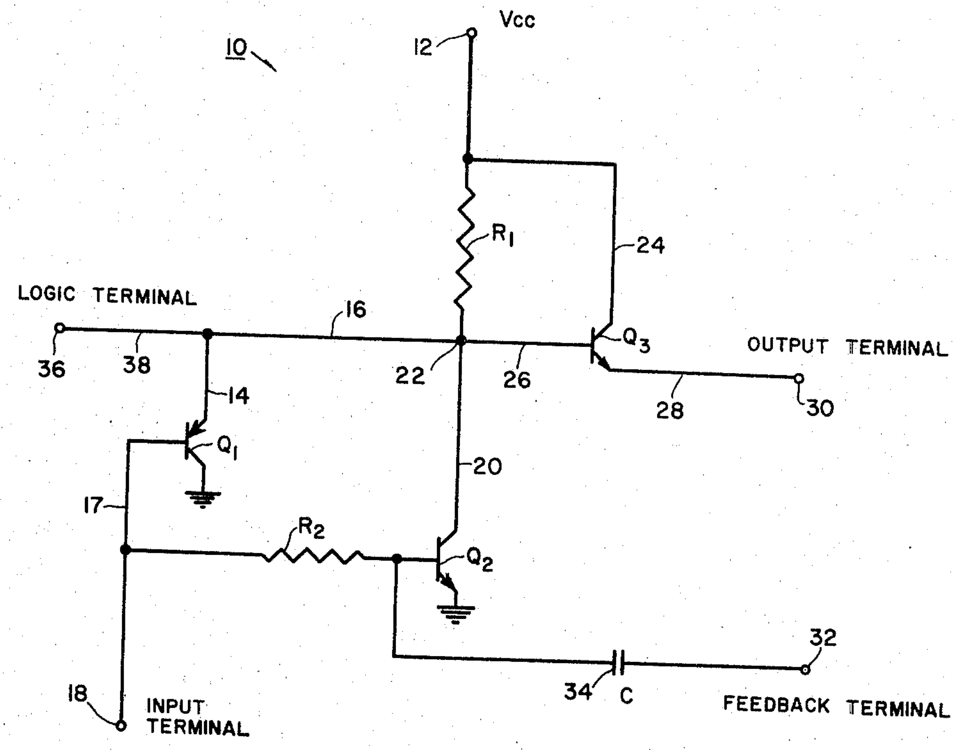
FIGURE 1 is a schematic diagram of a single pulse trigger circuit constructed in accordance with the present invention.

Referring now to the drawings, and in particular to FIGURE 1, a circuit constructed in accordance with the present invention is indicated generally by the reference numeral 10. A first PNP transistor $Q_1$ initiates the trigger pulse in response to a change in input voltage as will hereafter be described in detail. The emitter of transistor $Q_1$ is connected to a source of positive voltage 12 through conductors 14 and 16 and resistor $R_1$. The collector of the transistor $Q_1$ is connected to ground, and the base is connected to an input terminal 18. Thus it will be noted that transistor $Q_1$ is connected in what is generally referred to as the common-collector configuration in that the collector is common to both the input and the output signals. More specifically, the input voltage is determined between the base and the collector of the transistor $Q_1$, and the output voltage is measured between the emitter and collector. As will hereafter be described in greater detail, the transistor $Q_1$ may be replaced with a diode if the current gain of the transistor is not desired or needed to increase the input impedance of the circuit. In such a case, the collector of transistor $Q_1$ may merely be disconnected from ground and the emitter-base of the transistor will function as a diode. A second transistor $Q_2$ is an NPN transistor and is connected in common-emitter configuration. The collector of the transistor $Q_2$ is connected through conductor 20 to the conductor 16 at output control junction 22 and through the resistor $R_1$ to the source of voltage 12. The emitter of transistor $Q_2$ is connected to ground and the base is connected through resistor $R_2$ to the conductor 17 and therefore to the input terminal 18.

The collector of a third output NPN transistor $Q_3$ is connected by the conductor 24 to the source of voltage 12. The base of the transistor $Q_3$ is connected by conductor 26 to the junction 22, and the emitter is connected by conductor 28 to an output terminal 30. Thus the transistor $Q_3$ is connected in a common-collector configuration and also in what is termed an emitter-follower configuration. A feedback circuit represented by the terminal 32 may be connected through a capacitor 34 to the base of the transistor $Q_2$ if desired. Logic circuitry may be connected through the terminal 36 which is connected by conductor 38 to the junction between conductors 14 and 16 and therefore to the output control junction 22.

The trigger circuit 10 is particularly adapted for fabrication in an integrated circuit form wherein active components are formed by diffusion techniques in a single semiconductor crystal or substrate. A typical geometry for such a circuit using a P-type substrate crystal and a triple diffusion process is illustrated in the FIGURES 2–5. The first N-type diffusion is carried out in two steps so as to form N-type collector regions 40 and 48 for the NPN transistors $Q_2$ and $Q_3$, respectively, of greater depth than the N-type base region 54 of transistor $Q_1$. During the first N-type diffusion step, only the collector regions 40 and 48 are diffused. Then the collector regions 40 and 48 are diffused a second time as well as the base region 54 of transistor $Q_1$ and the N-type isolation regions 58 and 62 of resistors $R_2$ and $R_1$, respectively. The two-step diffusion permits optimization of both the PNP and NPN transistors. Next the P-type base regions 44 and 50 of the transistors $Q_2$ and $Q_3$, respectively, the P-type emitter region 56 of the PNP transistor $Q_1$, and the P-type resistive regions 60 and 64 of the resistors $R_2$ and $R_1$, respectively, are diffused. Finally the N-type emitter regions 46 and 52 of the transistors $Q_2$ and $Q_3$, respectively, are diffused.

Figure 2:
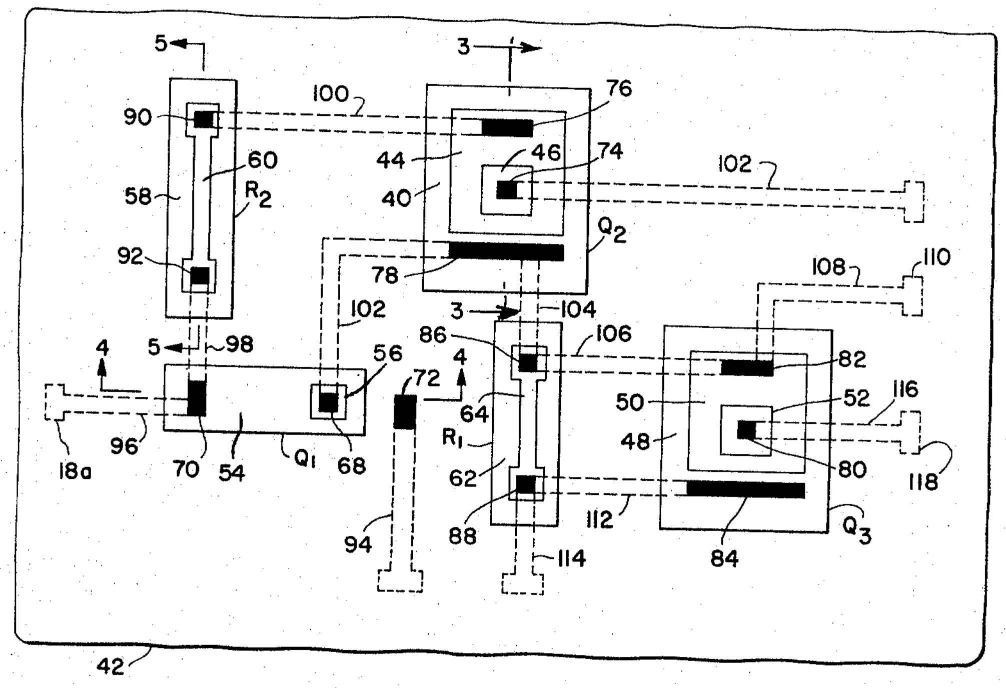
FIGURE 2 is a somewhat schematic plan view illustrating the manner in which the circuit of FIGURE 1 may be fabricated as an integrated circuit.
Figure 4:
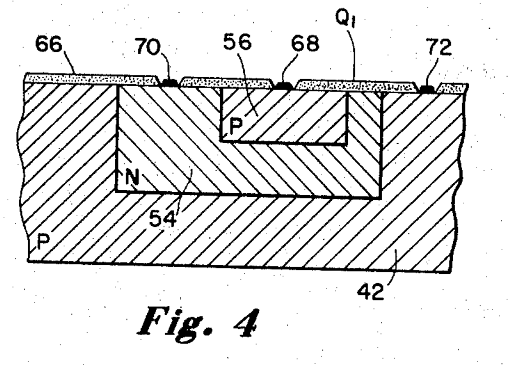
FIGURE 4 is a schematic sectional view taken substantially on lines 4—4 of FIGURE 2.
Figure 3:
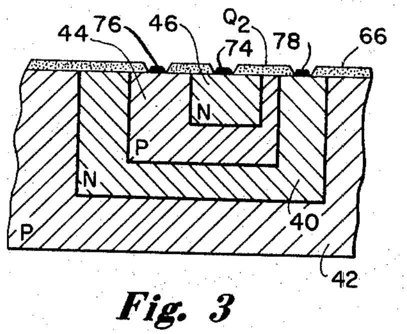
FIGURE 3 is a schematic sectional view taken substantially on lines 3—3 of FIGURE 2.
Figure 5:
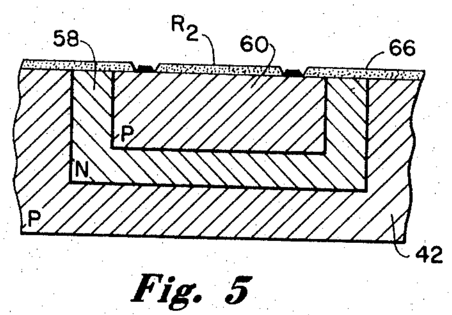
FIGURE 5 is a schematic sectional view taken substantially on lines 5—5 of FIGURE 2.

The various regions of the substrate crystal 42, as shown in FIGURES 3–5 may be selectively diffused by conventional and well-known techniques wherein the silicon oxide film formed over the surface of the silicon substrate 42 which acts as a diffusion barrier is removed over each region to be diffused during a particular diffusion step by selective etching technique. The oxide film is re-formed prior to each diffusion step and different areas selectively etched away preparatory to the next diffusion step. After all diffusions have been accomplished, the final silicon oxide film 66, which also serves as an electrical insulation, is selectively removed in each area where it is desired to make electrical contact with a diffused region of an active component formed in the substrate. Then a film of aluminum, or other conductive metal, is vapor-deposited over the entire surface of the substrate 42 and penetrates through the openings etched in the silicon oxide film 66. The substrate is then raised to an elevated temperature so that the aluminum will alloy with the various active regions of the substrate to make good electrical connections. Thus an emitter terminal 68, base terminal 70, and collector terminal 72 are made for the transistor $Q_1$. Similarly, emitter, base and collector terminals 74, 76 and 78, respectively, are formed for the transistor $Q_2$, as shown in FIGURE 2, base, emitter and collector terminals 80, 82 and 84, respectively, are formed for the transistor $Q_3$, terminals 86 and 88 are formed for the resistor $R_1$, and terminals 92 and 90 are formed for the resistor $R_2$.

The excess aluminum is then selectively removed to form the conductors and the various terminal pads for the circuit 10. For example, the collector contact 72 of transistor $Q_1$ is connected to ground by a conductor 94. The base contact 70 is connected by conductor 96 to the input terminal pad 18*a*, and by conductor 98, resistor $R_2$ and conductor 100 to the base contact 76 of transistor $Q_2$. The emitter 74 of transistor $Q_2$ is connected by connected by conductor 102 to ground. The collector contact 78 of transistor $Q_2$ is connected by conductor 104 to terminal 86 of resistor $R_1$, by conductor 106 to the base contact 82 of the transistor $Q_3$, and by conductor 108 to the logic terminal 110. The collector contact 84 of transistor $Q_3$ is connected by conductor 112 to the terminal 88 of resistor $R_1$ and by conductor 114 to the source of voltage. The emitter contact 80 of transistor $Q_3$ is connected by conductor 116 to the output terminal 118.

*Operation*

The operation of the trigger circuit 10 is dependent upon the fact that the switching time of transistor $Q_1$, which is connected in common-collector configuration, is faster than the switching time of transistor $Q_2$, which is connected in common-emitter configuration. As is well-known, a transistor connected in common-collector configuration, as is transistor $Q_1$, has a faster switching time than a transistor connected in common-emitter configuration, as is transistor $Q_2$. This is true primarily because when connected in the common-collector configuration, the transistor operates in the active state at all times, but when connected in the common-emitter configuration, operates either in the cut-off or in the saturated states. Thus when operating in the active region, the emitter of transistor $Q_1$ closely follows the base, and the transistor has a very rapid response to an input signal. On the other hand, when the common-emitter configuration transistor is in cut-off state, a considerable charge must be injected into the base of the transistor before switching occurs, and the charge required for switching is the function of current and time. Thus the time required to inject the necessary charge controls the switching time of transistor $Q_2$.

Thus assume for the moment that the logic circuit connected to the terminal 36 is in a high impedance condition. When the input voltage at terminal 18 is at a minimum, the emitter of the transistor $Q_1$ and therefore the output control junction 22 will be at a substantially the same low voltage. Since the base of the output transistor $Q_3$ is at the same low voltage, the emitter of transistor $Q_3$ and therefore the output terminal 30 will be at the low voltage value because transistor $Q_3$ is connected in emitter-follower configuration.

Figures 6, 7:
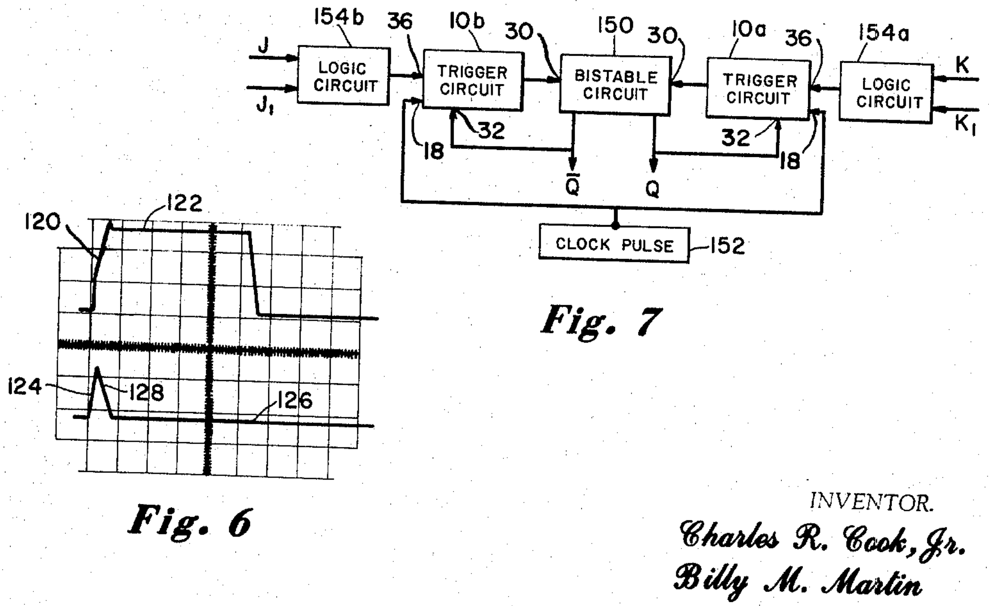
FIGURE 6 is a graph which serves to illustrate the operation of the circuit of FIGURE 1.
FIGURE 7 is a block diagram illustrating the manner in which the circuit of FIGURE 1 may be used in a circuit for a digital computer.

As the voltage to the input terminal 18 rises, as indicated generally by the rising portion 120 of the input voltage curve 122 of FIGURE 6, the emitter of the transistor $Q_1$ will immediately follow and thereby raise the voltage at the output control junction 22 and the base of transistor $Q_3$. Accordingly, the emitter of output transistor $Q_3$ and the output terminal 30 will rise with the input voltage generally along the rising portion 124 of the output voltage curve 126 of FIGURE 6. Thus it will be noted that transistor $Q_1$ initiates the output pulse in response to the rise in the input voltage.

As the input voltage at input terminal 18 rises, current will also flow through the resistor $R_2$ and into the base of transistor $Q_2$. After a time delay as determined by the value of resistor $R_2$, the current level through the resistor $R_2$, and the charge required to switch the transistor, the transistor $Q_2$ will then switch to a low impedance state. The low impedance state of transistor $Q_2$ will in effect connect the output control junction 22 to ground and reduce the voltage at the junction 22 and therefore at the base of transistor $Q_3$ to low voltage level. The voltage of the emitter of transistor $Q_3$ and output terminal 30 will follow downwardly generally along the decline 128 of the output voltage curve 126 of FIGURE 6. Thus it will be noted that transistor $Q_2$ terminates the output pulse in response to the rise in input voltage, which is the same event which causes transistor $Q_1$ to initiate the output pulse. The positive output pulse at output terminal 30 has a duration corresponding to the difference between the time required for transistors $Q_1$ and $Q_2$ to be switched.

The trigger circuit 10 is particularly well suited for use in an integrated circuit comprised of a complete storage section for a digital computer or the like such as that illustrated schematically in FIGURE 7. The circuit shown in FIGURE 7 is comprised of a bi-stable or "flop-flop" circuit 150 having outputs Q and $\overline{Q}$. The Q output is switched from high to low voltage state by a positive pulse from a trigger circuit 10*a* of the type illustrated in FIGURE 1, and the $\overline{Q}$ output is switched from high to low voltage state by a positive pulse from a similar trigger circuit 10*b*. A suitable clock pulse source 152 is connected to the input terminals 18 of each of the trigger circuits 10*a* and 10*b* to apply a positive-going clock pulse corresponding to the input voltage curve 122 of FIGURE 6 at predetermined intervals. Logic circuits 154*a* and 154*b* are connected to the logic terminals 36 of the respective trigger circuits 10*a* and 10*b* and vary the impedance between the respective logic terminals and ground between high and low values to enable and disable, respectively, the respective trigger circuits. Feedback from the Q and $\overline{Q}$ outputs are connected to the feedback terminals 32 of the circuit 10.

Now assume for the moment that the logic circuit 154*a* is in the low impedance states so that the logic terminal 36 is essentially connected to ground. This serves to disable the trigger circuit 10*a* because when the positive voltage clock pulse is applied to the terminal 18, the voltage of the emitter of transistor $Q_1$ and therefore the base of transistor $Q_3$ cannot rise due to the fact that the output control junction 22, as shown in FIGURE 1, is essentially connected to ground. On the other hand, assume that the logic circuit 154*b* is in the high impedance state so as to enable the output control junction 22 of the trigger circuit 10*b* to be raised to high voltage level. Therefore, when the clock pulse is simultaneously applied by both trigger circuits 10*a* and 10*b*, only the trigger circuit 10*b* is enabled by the logic circuit and a positive output pulse will be produced only by trigger circuit 10*b*.

Assume also that the $\overline{Q}$ output of the bi-stable circuit 150 is at the high voltage level and the Q output is at low voltage level. The positive pulse from the trigger circuit 10*b* will then switch the bi-stable circuit such that the $\overline{Q}$ output will change from high to low voltage level and the Q output from low to high voltage level. As the bi-stable circuit switches, the feedback signal from the $\overline{Q}$ output is passed through the capacitor 34 and appears as a negative pulse at the base of transistor $Q_2$. The negative pulse reduces the total current injected into the base of transistor $Q_2$ and thereby delays the time at which transistor $Q_2$ switches to low impedance. This increase the duration and sometimes the amplitude of the output pulse at the output terminal 30 and insures positive switching of the bi-stable circuit 150. On the other hand, as the Q output terminal switches from low to high voltage condition, a positive feedback pulse is passed through the capacitor 34 of the trigger circuit 10*a* and increases the total current injected at the base of transistor $Q_2$. This switches transistor $Q_2$ to low impedance at a faster rate, thereby reducing the duration of any pulse which might have been otherwise accidentally passed through the trigger circuit 10*a* as a result of improper operation of the logic circuit 154*a* and which, if passed, might have caused the bi-stable circuit 150 to be temporarily unstable and produce slight oscillations.

From the above detailed description of a preferred embodiment of the present invention, it will be evident that a novel and highly useful single pulse trigger circuit has been described. The trigger circuit is particularly adapted for use in integrated circuits in that no capacitor of any appreciable size is required in the circuit. This not only simplifies fabrication of the integrated circuit, but also increases the speed of operation of the trigger circuit and therefore of the computer circuit in which the trigger circuit might be used. The trigger circuit has a high input impedance at the input terminal 18 because of the current gain of transistor $Q_1$, and has a very low output impedance because of the current gain of transistor $Q_3$. If the transistor $Q_1$ is replaced with a diode, the operation of the circuit is substantially the same except that the current sink required to drive the input circuit is increased by a factor equal to the current gain of the transistor. The trigger circuit with the transistor input has low current sink requirements at the input terminals and is capable of driving bi-stable circuits having parallel transistors which is relatively difficult to do at high speeds by more conventional resistor-capacitor trigger circuits. The novel trigger circuit is particularly adapted for use in combination with other logic circuits because the trigger circuit can be disabled merely by connecting the logic terminal 36 through a low impedance to ground. The trigger circuit 10 is also particularly adapted for driving a bi-stable circuit because a feedback signal can be applied through the terminal 32 to lengthen or shorten the single pulse produced at the output terminal 30. It will be appreciated that the various transistors $Q_1$, $Q_2$, and $Q_3$ may be reversed in type, i.e., $Q_1$ may be an NPN transistor and $Q_2$ and $Q_3$ PNP transistors, and the voltages reversed in the conventional manner if desired without materially altering the operation of the novel circuit 10.

Although a preferred embodiment of the invention has been described in detail, it is to be understood that various changes, substitutions and alterations can be made therein without departing from the spirit and scope of the invention as defined by the appended claims.

What is claimed is:

1. A circuit for producing a single output pulse of short duration in response to an input voltage change comprising:

a first transistor connected in common-collector configuration for initiating the output pulse in response to an input voltage change, and a second transistor connected in common-emitter configuration for terminating the output pulse in response to the input voltage change and having a slower switching time than said first transistor in said common collector configuration, the emitter of the first transistor being directly connected to the collector of the second transistor, the junction therebetween comprising the output control point, and the collector of said first transistor and the emitter of said second transistor being at the same potential, whereby the duration of the output pulse at the output control point will be determined by the difference in the switching times of the first and second transistors.

2. A circuit as defined in claim 1 further characterized by:
   a third transistor whose base is directly connected to said output control point the impedance of which is controlled by the voltage of the output control point for decreasing the output impedance of the circuit.

3. A circuit for producing a single output pulse of short duration in response to an input voltage change comprising:
   a first transistor of one type connected in common-collector configuration for initiating the output pulse in response to an input voltage change, and
   a second transistor of the other type connected in common-emitter configuration for terminating the output pulse in response to the input voltage change and having a slower switching time than said first transistor in said common collector configuration, the emitter of the first transistor being directly connected to the collector of the second transistor, the junction therebetween comprising the output control point, and the collector of said first transistor and the emitter of said second transistor being at the same potential,
   and an input terminal directly connected to the base of said first transistor and through a resistor to the base of said second transistor,
   whereby the duration of the pulse at the output control point will be determined by the difference in the switching times of the first and second transistors.

4. A circuit as defined in claim 3 further characterized by:
   a third transistor the base of which is directly connected to the output control point and the impedance of which controls the output signal.

5. A circuit as defined in claim 3 further characterized by:
   conductor means for connecting the output control point to logic circuit means for selectively connecting the control point to ground through a low impedance or through a high impedance for disabling the circuit when the impedance is low and enabling the circuit when the impedance is high.

6. A circuit as defined in claim 3 further characterized by:
   feedback circuit means connected to the base of the second transistor for varying the switching time of the second transistor by applying a feedback pulse to the base.

7. A circuit for producing a single output pulse in response to a predetermined input voltage change comprising:
   a first transistor of one type the collector of which is connected to ground, the emitter of which is connected by a first resistor to a voltage supply, and the base of which is connected to an input, and
   a second transistor of the other type the emitter of which is connected to ground, said second transistor having a slower switching time than said first transistor, the collector of which is connected to the emitter of the first transistor, and the base of which is connected through a second resistor to the input, the junction between the emitter of the first transistor and the collector of the second transistor being the output control point,
   whereby the first transistor will initiate an output pulse in response to a change in input voltage, the second transistor will terminate the pulse in response to the change in input voltage, and the duration of the output pulse will be determined by the difference in switching times of the two transistors.

8. A circuit for producing a single output pulse in response to a predetermined input voltage change as defined in claim 7 further characterized by:
   a third transistor the base of which is connected to the output control point, the collector of which is connected to a supply voltage, and the emitter of which is connected to an output,
   whereby the output impedance of the circuit will be reduced.

9. A circuit for producing a single output pulse in response to a predetermined input voltage change as defined in claim 7 further characterized by:
   logic circuit means connected to the output control point for selectively connecting the control point to ground through a high impedance or through a low impedance in response to predetermined conditions,
   whereby the circuit will be disabled when the control point is connected to ground by a low impedance and will be enabled when the control point is connected to ground by a high impedance.

10. A circuit for producing a single output pulse in response to a predetermined input voltage change as defined in claim 8 further characterized by:
   bi-stable circuit means connected to the emitter of the third transistor having an output the voltage of which is changed in response to the output pulse from the emitter of the third transistor, and
   feedback circuit means connecting the output of the bi-stable circuit means to the base of the second transistor for varying the duration of the output pulse from the emitter of the third transistor.

11. A circuit for producing a single output pulse in response to a predetermined input voltage change comprising:
   a first transistor of one type the collector of which is connected to ground, the emitter of which is connected by a first resistor to a voltage supply, and the base of which is connected to an input,
   a second transistor of the other type the emitter of which is connected to ground, the collector of which is connected to the emitter of the first transistor, and the base of which is connected through a second resistor to the input, the junction between the emitter of the first transistor and the collector of the second transistor being the output control point,
   a third transistor the base of which is connected to the output control point, the collector of which is connected to a supply voltage, and the emitter of which is connected to an output,
   logic circuit means connected to the output control point for selectively connecting the control point to ground through a high impedance or through a low impedance in response to predetermined conditions,
   bi-stable circuit means connected to the emitter of the third transistor having an output the voltage of which is changed in response to the output from the emitter of the third transistor, and
   feedback circuit means connecting the output of the bi-stable circuit means to the base of the second transistor for varying the duration of the output pulse from the emitter of the third transistor.

12. A circuit for producing a single output pulse of short duration in response to an input voltage change comprising:
   a voltage supply,
   a diode junction having a forward direction defined from first to second terminals, one of the terminals being connected through a resistor to the voltage supply such that the diode junction will be normally forward-biased by the supply voltage and the other being connected to an input terminal,
   a transistor the emitter of which is connected to ground, the base of which is connected to the input terminal, and the collector of which is connected to said one terminal, the junction between the said one terminal and the collector comprising the output control point,
   whereby an input voltage change applied to the input terminal will result in an almost immediate corresponding voltage change in the control point as a result of the diode junction to initiate an output pulse and the transistor will be switched to low impedance after a short time to terminate the output pulse.

References Cited

UNITED STATES PATENTS

| | | | |
|---|---|---|---|
| 2,935,572 | 5/1960 | Hastings et al. | 307—88.5 X |
| 3,183,364 | 5/1965 | Pickering | 307—88.5 X |

| | | | |
|---|---|---|---|
| 3,278,685 | 10/1966 | Harper | 307—88.5 X |
| 3,283,174 | 11/1966 | Bauda | 307—88.5 X |

FOREIGN PATENTS

| | | |
|---|---|---|
| 821,765 | 10/1959 | Great Britain. |

ARTHUR GAUSS, *Primary Examiner.*

D. D. FORRER, *Assistant Examiner.*